US010717861B2

United States Patent
Lee

(10) Patent No.: US 10,717,861 B2
(45) Date of Patent: Jul. 21, 2020

(54) PERFLUORINATED IONOMER NANOPARTICLE DISPERSION SOLUTION, AND PREPARATION METHOD THEREFOR

(71) Applicant: DANKOOK UNIVERSITY CHEONAN CAMPUS INDUSTRY ACADEMIC COOPERATION FOUNDATION, Cheonan-si, Chungcheongnam-do (KR)

(72) Inventor: Chang Hyun Lee, Cheonan-si (KR)

(73) Assignee: DANKOOK UNIVERSITY CHEONAN CAMPUS INDUSTRY ACADEMIC COOPERATION FOUNDATION (KR)

( * ) Notice: Subject to any disclaimer, the term of this patent is extended or adjusted under 35 U.S.C. 154(b) by 61 days.

(21) Appl. No.: 15/570,334

(22) PCT Filed: Apr. 21, 2016

(86) PCT No.: PCT/KR2016/004141
§ 371 (c)(1),
(2) Date: Apr. 23, 2018

(87) PCT Pub. No.: WO2016/175502
PCT Pub. Date: Nov. 3, 2016

(65) Prior Publication Data
US 2018/0251631 A1    Sep. 6, 2018

(30) Foreign Application Priority Data

Apr. 28, 2015  (KR) .................. 10-2015-0059996
Apr. 28, 2015  (KR) .................. 10-2015-0060021

(51) Int. Cl.
| | | |
|---|---|---|
| C08L 27/18 | (2006.01) | |
| C08F 2/44 | (2006.01) | |
| C08K 3/22 | (2006.01) | |
| C08K 3/30 | (2006.01) | |
| C08K 3/36 | (2006.01) | |
| C09D 127/18 | (2006.01) | |
| C08J 3/09 | (2006.01) | |
| C08J 5/22 | (2006.01) | |
| C08F 214/26 | (2006.01) | |

(52) U.S. Cl.
CPC ............... *C08L 27/18* (2013.01); *C08F 2/44* (2013.01); *C08F 214/262* (2013.01); *C08J 3/095* (2013.01); *C08J 5/2237* (2013.01); *C08K 3/22* (2013.01); *C08K 3/30* (2013.01); *C08K 3/36* (2013.01); *C09D 127/18* (2013.01); *C08F 2500/01* (2013.01); *C08F 2500/03* (2013.01); *C08F 2500/17* (2013.01); *C08J 2327/18* (2013.01); *C08K 2003/2227* (2013.01); *C08K 2003/2237* (2013.01); *C08K 2003/2255* (2013.01); *C08L 2201/54* (2013.01); *Y02P 20/544* (2015.11)

(58) Field of Classification Search
CPC .... C08L 27/18; C08F 2/44; C08F 8/00; C08F 214/262; C08J 3/095; C08J 5/2237; C08K 3/22; C08K 3/30; C08K 3/36; C09D 127/18
USPC ........................................................ 524/567
See application file for complete search history.

(56) References Cited

U.S. PATENT DOCUMENTS 6,352,742 B1 *  3/2002  Murata ................. B01D 69/04
                                              427/115
2014/0154611 A1 *  6/2014  Ameduri ............... C08F 214/22
                                              429/492

FOREIGN PATENT DOCUMENTS

| JP | H1134083 A | 2/1999 |
| JP | 2010155943 A | 7/2010 |
| KR | 20060118518 A | 11/2006 |
| KR | 20080082239 A | 9/2008 |

OTHER PUBLICATIONS

Emery et al. ("The Development of New Membranes for Proton Exchange Membrane Fuel Cells," ECS Transactions, 2007, vol. 11, No. 1, pp. 3-14) (Year: 2007).*
Subianto et al. ("Physical and Chemical Modification Routes Leading to Improved Mechanical Properties of Perfluorosulfonic Acid Membranes for PEM Fuel Cells," Journal of Power Sources, Jul. 1, 2013, vol. 233, pp. 216-230) (Year: 2013).*
Emery et al., "The Development of New Membranes for Proton Exchange Membrane Fuel Cells", ECS Transactions, 11 (1) 3-14 (2007), 10.1149/1.2780909 The Electrochemical Society.

(Continued)

*Primary Examiner* — Kelechi C Egwim
(74) *Attorney, Agent, or Firm* — Renaissance IP Law Group LLP

(57) ABSTRACT

Disclosed are: an ionomer nanoparticle dispersion solution formed by dispersing a perfluorinated ionomer having an ion conductive functional group in a solvent mixture including water and an alcohol, and carrying out a reaction under a supercritical condition; and a preparation method thereof. The ionomer nanoparticle dispersion solution has a high azeotropic mixture content in a continuous phase, which is a liquid phase, so as to readily remove a solvent therefrom, and thus a product using the ionomer nanoparticle dispersion solution can be readily fabricated and preparation costs can be reduced. In addition, uniformity of the product is improved because a perfluorinated ionomer having various ion conductive functional groups and various salts thereof is nano-dispersed, in a narrow molecular weight distribution, in the ionomer nanoparticle dispersion solution.

19 Claims, No Drawings

(56) References Cited

OTHER PUBLICATIONS

Subianto et al., "Physical and chemical modification routes leading to improved mechanical properties of perfluorosulfonic acid membranes for PEM fuel cells", Journal of Power Sources 233 (2013) 216-230.

* cited by examiner

PERFLUORINATED IONOMER NANOPARTICLE DISPERSION SOLUTION, AND PREPARATION METHOD THEREFOR

TECHNICAL FIELD

The present invention relates to an ionomer nanoparticle dispersion solution in which a perfluorinated ionomer having various ion conductive functional groups and various salts thereof is nano-dispersed in a mixed solvent including water and an alcohol, and a preparation method thereof.

BACKGROUND ART

A polymer electrolyte membrane fuel cell (PEMFC) is a pollution-free energy conversion system that generates high-efficiency energy by using an electrochemical-catalytic reaction of hydrogen gas based on a polymer electrolyte membrane (PEM) which selectively permeates only hydrogen ions (protons, $H^+$).

Examples of a representative material for a polymer electrolyte membrane or a catalyst binder of the polymer electrolyte membrane fuel cell include a perfluorinated sulfonic acid ionomer (PFSA) such as Nafion manufactured by DuPont Co., Ltd.

The perfluorinated sulfonic acid ionomer (PFSA) is known to have high hydrogen ion conductivity and excellent chemical stability, but exhibits a problem in that the hydrogen ion conductivity rapidly deteriorates due to the spontaneous evaporation of water during operation in a dry state, and a fatal weak point in that a chemical/electrochemical decomposition occurs under harsh conditions. A concept introduced in order to solve these problems is a reinforced composite membrane (pore-filling membrane; PFM) in which a perfluorinated/partially fluorinated/hydrocarbon-based hydrogen ion conductive ionomer is impregnated in a porous support having excellent chemical durability.

For an effective preparation of a PFM, the ionomer needs to be prepared while being completely dissolved or dispersed in a solvent. At this time, when a solvent is removed for film formation, it is preferred to use a co-solvent of water and an alcohol instead of an organic solvent in order to solve an environmental problem, achieve ease of molding, and completely remove the solvent.

A perfluorinated sulfonic acid ionomer used for a preparation of a polymer electrolyte membrane, a catalyst binder, and a PFM is prepared by emulsion polymerization, and thus is used in an emulsion state in a co-solvent of water and isopropyl alcohol or normal propyl alcohol.

Up to now, various attempts for the preparation of a perfluorinated, partially fluorinated, or hydrocarbon-based ionomer nanoparticle dispersion solution have been made. Partially fluorinated or hydrocarbon-based solid ionomers attempted in J. Power Sources 2006, 163, 56, Electrochim Acta. 2007, 52, 4916, Electrochem. Soc. 2007, 154, B739, and J. Power Sources 2007, 169, 271 could not be dissolved in water or alcohol unless the degree of hydrophilicity of the ionomer was increased. Further, when an ionomer having a high degree of hydrophilicity is used as a polymer electrolyte membrane (PEM) or a catalyst binder, the ionomer is dissolved/leaked under high temperature and humidity conditions during the operation of a fuel cell, and thus interfacial delamination between a polymer electrolyte membrane (PEM) and an electrode is caused, thereby exhibiting a problem in that the electrochemical performance rapidly deteriorates.

Meanwhile, when an organic solvent is used instead of water or alcohol, or a partial organic solvent is introduced into a co-solvent of water and an alcohol, the introduced organic solvent remains through a strong secondary bond to an ion conductive functional group of an ionomer, thereby causing a problem of poisoning the electrode.

So far, a method of producing hydrocarbon-based and partially fluorinated ionomer nanoparticle dispersion solutions which are nano-dispersed in a mixed solvent including water and an alcohol has not been reported at all. Accordingly, when an electrode is prepared, for the use of a catalyst binder, a commercially available perfluorinated sulfonic acid ionomer (PFSA) emulsion having a structure and chemical properties which are completely different from those of the same type of ionomer is used instead of the same type of ionomer, thereby causing an interfacial problem between a polymer electrolyte membrane (PEM) and an electrode layer and a short service-life characteristic problem in the long-term point.

Even in a solid-phase perfluorinated sulfonic acid ionomer (PFSA), a solubility problem with respect to water and an alcohol solvents or a co-solvent thereof commonly occurs. As reported in Anal. Chem. 1982, 54, 1639, an aqueous ionomer solution can be produced by heating a perfluorinated sulfonic acid ionomer (PFSA) having a relatively high degree of hydrophilicity (for example, EW 970) in an aqueous solution, but the prepared aqueous ionomer solution exhibited a limitation in solubility, and thereafter, when a fuel cell electrode layer is introduced, the fuel cell could not be operated for a long period of time due to weak hydration stability.

As a method for solving these problems, a method of producing a perfluorinated sulfonic acid ionomer (PFSA) emulsion from a fluorine monomer through aqueous emulsion polymerization was developed as in US 2005/0096442 and U.S. Pat. No. 7,071,271, and has been adopted and used in current commercially available processes. The method is effective for producing a perfluorinated sulfonic acid ionomer (PFSA) aqueous emulsion having a relatively stable degree of hydrophilicity under a co-solvent condition of water and an alcohol. However, the method has a limitation in obtaining a high molecular weight and has a wide molecular weight distribution (polydispersity index, PDI), due to inherent synthetic characteristics of emulsion polymerization. Further, due to limited monomer conditions and synthetic processes for emulsion polymerization, it is possible to obtain, as a reactant, only a perfluorinated sulfonic acid ionomer (PFSA) in the form of sulfonic acid ($-SO_3H$) having thermal stability at 100° C. or less. Further, due to the difficulties in controlling a co-solvent ratio, the method exhibits a limitation in controlling the concentration and viscosity of the ionomer, reveals a problem in the compatibility with organic and inorganic materials to be introduced for the preparation of a polymer electrolyte membrane (PEM) and an electrode, and thus exhibits difficulties in an effective modification of the membrane/electrode assembly (MEA).

Technical Problem

It is a first object of the present invention to provide a homogeneous ionomer nanoparticle dispersion solution in which a perfluorinated ionomer having various ion conductive functional groups and various salts thereof is nano-dispersed in a continuous phase including water and an alcohol in a high azeotropic mixture content.

Further, it is a second object of the present invention to provide a method of preparing a homogenous ionomer nanoparticle dispersion solution in which a perfluorinated ionomer is nano-dispersed for achieving the first object.

Technical Solution

One aspect of the present invention provides an ionomer nanoparticle dispersion solution including: a continuous-phase ionomer mixed solution including water and an alcohol; and ionomer nanoparticles dispersed in the ionomer mixed solution and prepared from a perfluorinated ionomer which is insoluble in both water and an alcohol, in which an azeotropic mixture content in the ionomer mixed solution is 20 wt % or more.

Another aspect of the present invention provides a method of preparing an ionomer nanoparticle dispersion solution, the method including: preparing a mixed solvent including water and an alcohol; forming an ionomer mixed solution by putting a perfluorinated ionomer into the mixed solvent; and forming ionomer nanoparticles by reacting the ionomer mixed solution under a supercritical condition.

Advantageous Effects

The ionomer nanoparticle dispersion solution prepared according to the present invention as described above can be used to readily mold a product, and preparation costs can be reduced because an azeotropic mixture content in a continuous phase, which is a liquid phase, is high so as to readily remove a solvent therefrom. In addition, uniformity of the product is improved because a perfluorinated ionomer having various ion conductive functional groups and various salts thereof is nano-dispersed, in a narrow molecular weight distribution, in the dispersion solution.

Furthermore, according to the present invention, a perfluorinated ionomer having various forms can be prepared, and an ionomer nanoparticle dispersion solution can be obtained by a simple method without losing the molecular weight of the ionomer. Further, the size of the ionomer nanoparticles can be controlled by controlling temperature, pressure, and the ratio of solvents. Furthermore, according to the field to which the ionomer nanoparticle dispersion solution is applied, an ionomer nanoparticle dispersion solution suitable for various application fields can be prepared by changing the composition and content of the solvent.

Further, an ionomer constituting nanoparticles contained in the ionomer nanoparticle dispersion solution has a high molecular weight, so that a polymer electrolyte membrane prepared by using the ionomer has a higher thermal stability and higher mechanical strength than those of a membrane prepared by using a commercially available ionomer emulsion.

In addition, a perfluorinated ionomer having various salts ($-SO_3^-M^+$; for example, $M=Li^+$, $Na^+$, $K^+$, and the like) and having high heat resistance is uniformly nano-dispersed in a dispersion solution, so that when a polymer electrolyte membrane is prepared by using the dispersion solution, it is possible to shorten the preparation process of the polymer electrolyte membrane and to reduce the preparation costs thereof. That is, when a commercially available dispersion solution limited to an ionomer having a proton type sulfonic acid group ($-SO_3^-H^+$) is used, a three-step process consisting of a process (NaCl solution treatment) of converting the sulfonic acid group into a salt (for example, $-SO_3^-Na^+$) for avoiding thermal decomposition phenomenon occurring at a temperature of 100° C. or more due to a relatively low heat resistance, a process of removing excessively introduced salts, and a drying process has been used, but according to the present invention, the polymer electrolyte membrane can be fabricated through a more simplified preparation process.

DETAILED DESCRIPTION

The present invention suggests solution composed of homogenously dispersed perfluorinated ionomer nanoparticles with a variety of functional groups in a wide range of salt forms and continuous phases including water and alcohols where the ionomers generally have very low solubility. The invention provides polymer electrolyte membranes, and membrane-electrode assemblies based on the polymer electrolyte compositions.

Perfluorinated Ionomer Nanoparticles

In the present invention, an ionomer refers to an ion conductive polymer having fixed ions (typically anions) attached to a side chain of a polymer through covalent bonds.

Preferably, the ionomer has one or more ion conductive functional groups selected from the group consisting of sulfonic acid, a sulfonate, carboxylic acid, a carboxylate, and a fluorosulfonyl.

At this time, the sulfonate may be one selected from the group consisting of lithium sulfonate, sodium sulfonate, potassium sulfonate, magnesium sulfonate, calcium sulfonate, ammonium sulfonate, and alkylammonium sulfonate.

Further, the carboxylate may be one selected from the group consisting of lithium carboxylate, sodium carboxylate, potassium carboxylate, and alkylammonium carboxylate.

Preferred examples of a perfluorinated ionomer include poly(perfluorosulfonic acid), poly(perfluorocarboxylic acid), a copolymer of tetrafluoroethylene and fluorovinylether including a sulfonic acid group, or a combination thereof, or commercially available Nafion, Flemion, Aciplex, the 3M ionomer, the Dow ionomer, the Solvay ionomer, the Sumitomo 3M ionomer, or a mixture thereof.

At this time, the ionomer nanoparticles have an average particle size of preferably 0.01 nm to 600 nm, and a content thereof is preferably 0.01 wt % to 30 wt % in the entire dispersion solution.

The ionomer constituting the nanoparticles of the present invention has a molecular weight distribution (polydispersity index, Mw/Mn, PDI) of 1.0 to 2.5. In the dispersion solution of the present invention, when the ionomer has a molecular weight distribution of less than 1.0, it is difficult to achieve this molecular weight distribution because the molecular weight distribution is equal to or less than a theoretical limit which may be achieved through well-controlled synthesis of a polymer, and when the ionomer has a molecular weight distribution of more than 2.5, there is a problem in that mechanical properties deteriorate.

Additive

An additive may be included in the ionomer nanoparticle dispersion solution of the present invention.

The additive preferably has a nano size, and may also be dispersed in the ionomer nanoparticle dispersion solution or adsorbed onto the perfluorinated ionomer nanoparticles.

Further, the additive contributes to improving durability when an electrolyte membrane is prepared by using the ionomer nanoparticle dispersion solution. For example, mechanical characteristics and chemical durability of an electrolyte membrane are improved by using a nano-sized additive. Furthermore, the additive may contribute to improving hydrogen ion conductivity. For example, an additive in the form of a solid acid itself is spontaneously dissociated, and thus may serve as a stable supply source of hydrogen ions by imparting additional hydrogen ion conductivity to a polymer electrolyte membrane having a hydrogen ion conductivity. When a solid oxide additive is disposed under a condition of a polymer electrolyte membrane prepared by using an ionomer nanoparticle dispersion solution having characteristics of a solid acid, surface characteristics thereof have an additional hydrogen ion transfer characteristic while exhibiting acidity.

The additive is at least one selected from the group consisting of $TiO_2$, $SiO_2$, $Al_2O_3$, $ZrO_2$, tetraethoxysilane (TEOS), montmorillonite, mordenite, zirconium phosphate (ZrP), phosphotungstic acid, silicotungstic acid, phosphomolybdic acid, silicomolybdic acid, and a mixture thereof.

Further, when the additive is adsorbed onto ionomer nanoparticles, a hydrogen ion conductive channel may be formed while exhibiting acidity at a bonded surface or interface between the ionomer nanoparticle formed of the polymer material and the additive. Through the formation of the hydrogen ion conductive channel, the conductivity of the hydrogen ions is improved.

Dispersant

Further, the additive may be included along with a dispersant in the ionomer nanoparticle dispersion solution. The dispersant is any one selected from the group consisting of a fluorine-based aliphatic compound including a hydrophilic functional group and a mixture thereof.

At this time, a main chain of a fluorine-based aliphatic compound including a hydrophilic functional group includes a linear or branched C4 to C30 alkyl group, or a linear or branched C4 to C30 alkylene oxide.

Further, the fluorine-based aliphatic compound including the hydrophilic functional group has an amphiphilic structure having both hydrophobicity and hydrophilicity because one hydrophilic functional group selected from the group consisting of —H, —$NH_4^+$, —$SO_3H$, —$SO_3NH_4$, —$P(O)(ONH_4)$, —$P(O)(ONH_4)_2$, and a combination thereof is included at one end of the fluorine-based aliphatic compound.

The fluorine-based aliphatic compound including the hydrophilic functional group may be directly prepared and used, or a commercially available product may be purchased and used. As an example, one selected from the group consisting of a Zonyl-based dispersant manufactured by DuPont Co., Ltd., a Novec-based dispersant manufactured by 3M, and a mixture thereof is used. Specifically, as the Zonyl-based dispersant, Zonyl TBS($RfCH_2CH_2SO_3X$ (X=H or $NH_4$), Rf=$F(CF_2CF_2)_{3-8}$), Zonyl FSN ($RfCH_2CH_2O(CH_2CH_2O)_xH$) or Zonyl FSP($RfCH_2CH_2O)P(O)(ONH_4)_2$, and the like may be used. Further, examples of the Novec-based dispersant include Novec 4200 (ammonium fluoroalkylsulfonamide), Novec 4300 (ammonium fluoroalkylsulfonate), Novec 4430 (polymeric fluorochemical additive) or Novec 4432 (polymeric fluorochemical additive), and the like.

A content of the additive in the entire ionomer nanoparticle dispersion solution including the dispersant is 0.001 wt % to 15 wt %. When the content of the additive is less than 0.001 wt %, the additive cannot serve as an additive, and when the content of the additive is more than 15 wt %, physical properties of the polymer electrolyte membrane cannot be obtained during the formation of a polymer electrolyte membrane by using an ionomer nanoparticle dispersion solution. For example, when an additive, which is an inorganic nanoparticle having a content of more than 15 wt %, is formed in a polymer electrolyte membrane, the elongation or ion exchange ability of the polymer film deteriorates.

The ionomer forming the nanoparticles has a number average molecular weight of 70,000 Da to 500,000 Da, and the electrolyte composition has a viscosity of 10 cP to 250 cP. Within this molecular weight range, more improved mechanical properties may be secured. When the number average molecular weight is less than 70,000 Da, the mechanical strength is so weak that the ionomer is not suitable for application to a polymer, and when the number average molecular weight is more than 500,000 Da, the number average molecular weight is equal to or more than an equilibrium condition in a correlation between molecular weight and mechanical strength, and thus does not significantly affect mechanical properties, so that the ionomer is not economically efficient because an effect of an increase in molecular weight is negligible.

Continuous Phase

A continuous phase includes water and an alcohol as the balance except for ionomer nanoparticles in the entire dispersion solution. At this time, a volume ratio of water to alcohol is preferably 17:83 to 75:25.

If an additive is included in the ionomer nanoparticle dispersion solution, a dispersant may be further included in the continuous phase. The component and composition of the dispersant are the same as those described above.

The alcohol in the continuous phase may be an alcohol solvent whose main chain having 1 to 10 carbon atoms includes one or more hydroxyl groups. More preferably, it is possible to use an alcohol in which one or more hydroxyl groups are bonded to a main chain having 1 to 7 carbon atoms, but the present invention is not limited thereto.

An example of the alcohol is preferably one selected from the group consisting of methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol, 4-heptanol, and a mixture thereof.

An organic plasticizer other than water and an alcohol may be additionally included in the continuous phase.

The organic plasticizer induces strong bonding or cohesive strength between ionomer nanoparticles when a polymer film is formed.

Preferably, the organic plasticizer may be one selected from the group consisting of acetone, ethyl carbonate, propylene carbonate, diethyl carbonate, dimethyl carbonate, ethyl methyl carbonate, fluoroethylene carbonate, dimethylacetamide, dimethyl sulfoxide, dimethylformamide, N-methylpyrrolidone, and a mixture thereof. At this time, a content of the organic plasticizer may be 0.01 wt % to 40 wt % in the entire ionomer nanoparticle dispersion solution.

When the content of the organic plasticizer is less than 0.01 wt %, the function of the plasticizer may not be expected to work, and when the content of the organic plasticizer is more than 40 wt %, a problem in that a porous base membrane is dissolved or the compatibility with a base membrane is impaired during a process of preparing a functional ion exchange membrane occurs.

In the present invention, an azeotropic mixture of an alcohol or alcohol-an organic plasticizer and water is formed, thereby lowering the boiling point of the entire mixed solvent.

In the present specification, the "azeotropic mixture" refers to a solution in which the component ratios of the solution and vapor become the same in a liquid having a specific component ratio when the liquid boils without a change in component ratio at a predetermined temperature as in a pure liquid. An equilibrium temperature, which is a boiling point of an azeotropic mixture, is referred to as an azeotropic point, an azeotropic state where the component ratios of a solution and vapor become the same is changed by pressure, and the azeotropic point exhibits a minimum value or a maximum value on a boiling point curve showing a relationship between the component ratio and the boiling point.

The ionomer nanoparticle dispersion solution of the present invention has a high azeotropic mixture content in a continuous phase. The content is preferably 20 wt % or more in the continuous phase, and more preferably 25 wt % to 50 wt % in the continuous phase. When the azeotropic mixture content in the continuous phase is within this range, an efficiency of removing the continuous phase, that is, the solvent may be maximized. At this time, when the azeotropic mixture content in the continuous phase is less than this range, the economic advantage is not significant because an evaporation rate of the solvent from the co-solvent is not as fast as that of the solvent from a general mixed solvent, and on the contrary, when the content in the co-solvent is more than this range, the content is meaningless because the content cannot be theoretically achieved.

The method of preparing an ionomer nanoparticle dispersion solution according to the present invention may be carried out through the following steps.

First, a mixed solvent of water and an alcohol is prepared.

Subsequently, an ionomer mixed solution is formed by putting a perfluorinated ionomer into the mixed solvent. Further, according to exemplary embodiments, an organic plasticizer, an additive, and a dispersant may be put into the ionomer mixed solution.

By putting the organic plasticizer, the additive, and the dispersant into the ionomer mixed solution, an ionomer mixed solution in which the additive, the dispersant, and the perfluorinated ionomer are put into a continuous phase of water, an alcohol, and an organic plasticizer is formed.

The composition and content of the organic plasticizer, the additive, and the dispersant are as described above.

Subsequently, ionomer nanoparticles are formed by reacting the ionomer mixed solution contained in a reaction vessel under a supercritical condition. According to the formation of ionomer nanoparticles, the organic plasticizer participates in the formation of the ionomer nanoparticles. For example, the organic plasticizer allows polymer ionomers to be formed as nanoparticles with a predetermined size by controlling a bonding strength or a cohesive strength between ionomers which are polymers in a supercritical reaction. The organic plasticizer may remain in the ionomer mixed solution which is a continuous phase through a strong physical and chemical interaction with the ionomer.

The supercritical condition is a temperature of 100° C. or more and a pressure of 20 psig or more, but is not limited thereto. Preferably, the supercritical condition is a temperature of 100° C. to 300° C. and a pressure of 20 psig to 3,000 psig.

In the present invention, the ionomer mixed solution may be reacted by appropriately adjusting temperature and pressure so as to be suitable for the desired size and distribution of ionomer nanoparticles.

When the temperature is less than 100° C. or the reaction pressure is less than 20 psig, there are problems in that the size of ionomer nanoparticles to be prepared is increased and the particle size distribution becomes broad, and on the contrary, when the temperature is more than 300° C., or the pressure is more than 3,000 psig, the economic efficiency is low because a high temperature and a high pressure need to be maintained.

In the present invention, a reaction time for producing ionomer nanoparticles is 5 minutes to 24 hours. When the reaction time is less than this range, there are problems in that the particles become large and the particle size distribution becomes broad, and when the reaction time is more than this range, there is a problem in that the economic efficiency is low.

The mixed solvent put into the reactor under the supercritical condition as described above is in a supercritical fluid state. The supercritical fluid is an incompressible fluid under a temperature and a pressure, which are equal to or more than their critical points, and exhibits unique characteristics which do not occur in an existing organic solvent. That is, the supercritical fluid has excellent physical properties such as a large density that is close to that of a liquid, a low viscosity and a high diffusion coefficient that are close to those of a gas, and a very low surface tension at the same time. As described above, the supercritical fluid permeates into ionomer chains, and thus weakens ionomer intermolecular/intramolecular interactions in an ionomer molecule, thereby forming nanoparticles. In addition, the content of a vapor phase alcohol is gradually increased while repeating evaporation and condensation of a co-solvent of water and an alcohol as a liquid phase at a rapid rate under the supercritical condition. As a result, the content comes close to an azeotropic mixture composition under a predetermined temperature and a predetermined pressure, and during the condensation after the reaction is terminated, the content of the azeotropic mixture is absolutely increased.

At this time, any form may be used as a form of a perfluorinated ionomer put into a reactor, and as an example, it is possible to have a form of a film, a plate, a pellet, a powder or a fiber.

When the supercritical condition is maintained for a predetermined time, and then the pressure is returned to atmospheric pressure as described above, the reaction is terminated. That is, without a separate recovery step, and the like simultaneously after the reaction is terminated, it is possible to obtain a homogeneous nanoparticle dispersion solution including uniformly dispersed perfluorinated ionomer nanoparticles having various ion conductive functional groups and various salts thereof having a very low solubility with respect to a continuous phase including water and an alcohol.

The aforementioned dispersion solution of the present invention has the advantages as follows.

1. High Average Molecular Weight and Narrow Molecular Distribution of Ionomer

The ionomer has a higher molecular weight and a narrower molecular weight distribution than those of a commercially available ionomer dispersion solution prepared through emulsion polymerization.

2. Increase in Viscosity and Azeotropic Mixture

Due to the high molecular weight of the ionomer, the ionomer shows a high viscosity in the co-solvent phase having the same composition. Further, the solvent is readily removed by lowering the boiling point of a continuous phase due to the high azeotropic mixture content in the continuous phase.

3. Increase in Thermal Stability, Chemical Stability, and Mechanical Strength

Due to an increase in molecular weight and an increase in intermolecular or intramolecular hydrogen bonding force and van der Waals force through the increase in molecular weight, when a polymer electrolyte membrane is prepared, the thermal stability, chemical stability, and mechanical strength of the polymer electrolyte membrane are increased compared to those of a polymer electrolyte membrane prepared by using a commercially available ionomer dispersion solution.

4. Simplified Membrane Fabrication Processes Irrespective of Reinforced Composite Membrane and Free-Standing Membrane When a membrane was fabricated with a commercially available ionomer dispersion where the ionomer has sulfonic acid ($-SO_3H$) groups in proton form (e.g., EW=1,100), its solvent is evaporated at a temperature lower than the glass transition temperature. Consequently, the resulting membrane shows weak mechanical strength. Accordingly, a heat treatment should surely be carried out at a temperature higher than 200° C. in order to solve this low mechanical strength problem. However, the proton type sulfonic acid group is thermally decomposed from 100° C., and when a heat treatment is carried out after the membrane is formed, hydrogen ion conductivity is sharply reduced. Accordingly, the process of preparing a membrane is additionally accompanied by a three-step process consisting of a process (NaCl solution treatment) of converting proton type sulfonic acid into a salt (for example, $-SO_3^-Na^+$) in which heat resistance is secured up to 300° C., a process of removing excessive salts, and a drying process. Subsequently, a high mechanical strength may be secured through continuous heat treatment at a temperature of 200° C. or more. However, when the ionomer nanoparticle dispersion solution having an ion conductive functional group in the form of various salts according to the present invention is used, the aforementioned additional process may be omitted.

5. Improvement of Hydrogen Ion Conductivity

Since a commercially available ionomer dispersion solution has a predetermined ionomer EW value (for example, 1,100), whereas the dispersion solution of the present invention includes ionomer nanoparticles having various EW values, the degree of hydrophilicity and hydrogen ion conductivity may be improved by using an ionomer having a low EW value.

Hereinafter, preferred Examples for helping the understanding of the present invention will be suggested. However, the following Examples are provided only to more easily understand the present invention, and the contents of the present invention are not limited by the Examples.

Example 1

A co-solvent of water/isopropyl alcohol (25:75 by volume ratio) and 5 wt % of a dry Nafion 112 membrane having sulfonic acid ($-SO_3^-H^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 2

A co-solvent of water/isopropyl alcohol (25:75 by volume ratio) and 10 wt % of a dry Nafion 112 membrane having sulfonic acid ($-SO_3^-H^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 3

A co-solvent of water/isopropyl alcohol (57:43 by volume ratio) and 20 wt % of a dry Nafion 112 membrane having sulfonic acid ($-SO_3^-H^+$) as an ion conductive functional group were put into a high-temperature and high-pressure reactor so as to be 100 wt % in total, and the resulting mixture was subjected to a supercritical reaction at 160° C. under a pressure of 500 psig for 20 minutes. Thereafter, when the pressure was returned to atmospheric pressure, the reaction was terminated.

Example 4

A co-solvent of water/isopropyl alcohol (57:43 by volume ratio) and 20 wt % of a dry Nafion 112 membrane having sulfonic acid ($-SO_3^-H^+$) as an ion conductive functional group were put into a high-temperature and high-pressure reactor so as to be 100 wt % in total, and the resulting mixture was subjected to a supercritical reaction at 160° C. under a pressure of 500 psig for 120 minutes. Thereafter, when the pressure was returned to atmospheric pressure, the reaction was terminated.

Example 5

A co-solvent of water/isopropyl alcohol (57:43 by volume ratio) and 20 wt % of a dry Nafion 112 membrane having sulfonic acid ($-SO_3^-H^+$) as an ion conductive functional group were put into a high-temperature and high-pressure reactor so as to be 100 wt % in total, and the resulting mixture was subjected to a supercritical reaction at 200° C. under a pressure of 1,900 psig for 1 day. Thereafter, when the pressure was returned to atmospheric pressure, the reaction was terminated.

Example 6

A co-solvent of water/isopropyl alcohol (75:25 by volume ratio) and 1.5 wt % of a dry Nafion 112 membrane having sodium sulfonate ($-SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 7

A co-solvent of water/isopropyl alcohol (75:25 by volume ratio) and 1.5 wt % of a dry Nafion 112 powder having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 8

A co-solvent of water/isopropyl alcohol (50:50 by volume ratio) and 1.5 wt % of a dry Nafion 112 membrane having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 9

A co-solvent of water/isopropyl alcohol (17:83 by volume ratio) and 1.5 wt % of a dry Nafion 112 membrane having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 10

A co-solvent of water/isopropyl alcohol (50:50 by volume ratio) and 1.5 wt % of a dry Nafion 112 powder having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 11

A co-solvent of water/isopropyl alcohol (17:83 by volume ratio) and 1.5 wt % of a dry Nafion 112 pellet having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 12

A co-solvent of water/isopropyl alcohol (17:83 by volume ratio) and 1.5 wt % of a dry Nafion 112 fiber (diameter: 1 mm) having sodium sulfonate ($—SO_3^-Na^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 13

A co-solvent of water/isopropyl alcohol (17:83 by volume ratio) and 20 wt % of a dry Nafion 112 fiber (diameter: 0.5 mm) having sulfonic acid ($—SO_3^-H^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 14

A co-solvent of water/isopentyl alcohol (57:43 by volume ratio) and 20 wt % of a dry Nafion 112 membrane having sulfonic acid ($—SO_3^-H^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 15

A co-solvent of water/isopropyl alcohol/acetone (60:20:20 by volume ratio) and 20 wt % of a dry Nafion 112 membrane having sulfonic acid ($—SO_3^-H^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 16

A co-solvent of water/isopropyl alcohol (57:43 by volume ratio), 20 wt % of a dry Nafion 112 membrane having sulfonic acid ($—SO_3^-H^+$) as an ion conductive functional group, and 5 wt % of $Al_2O_3$ were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 17

A co-solvent of water/isopropyl alcohol (57:43 by volume ratio), 20 wt % of a dry Nafion 112 membrane having sulfonic acid ($—SO_3^-H^+$) as an ion conductive functional group, 6 wt % of Zonyl TBS, and 3 wt % of silica (Aerosil 812, hydrophobic silica) were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 18

A co-solvent of water/isopropyl alcohol (25:75 by volume ratio), 5 wt % of a dry Nafion 112 membrane having sulfonic acid (—SO$_3^-$H$^+$) as an ion conductive functional group, 12 wt % of Zonyl FSP ([F(CF$_2$CF$_2$)$_{3-8}$CH$_2$CH$_2$O]P(O)(ONH)$_2$, a density of 1.15 g/ml), and 3 wt % of silica (Aerosil 812, hydrophobic silica) were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 19

A co-solvent of water/1-pentanol (25:75 by volume ratio) and 5 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 20

A co-solvent of water/1-heptanol (57:43 by volume ratio) and 20 wt % of a dry Nafion 112 membrane having sulfonic acid (—SO$_3^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 21

A co-solvent of water/isopropyl alcohol (25:75 by volume ratio) and 5 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 22

A co-solvent of water/isopropyl alcohol (57:43 by volume ratio) and 20 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 23

A co-solvent of water/isopropyl alcohol (75:25 by volume ratio) and 1.5 wt % of a dry Flemion membrane having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 24

A co-solvent of water/isopropyl alcohol (75:25 by volume ratio) and 1.5 wt % of a dry Flemion powder having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 25

A co-solvent of water/isopropyl alcohol (50:50 by volume ratio) and 1.5 wt % of a dry Flemion membrane having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 26

A co-solvent of water/isopropyl alcohol (17:83 by volume ratio) and 1.5 wt % of a dry Flemion membrane having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 27

A co-solvent of water/isopropyl alcohol (50:50 by volume ratio) and 1.5 wt % of a dry Flemion powder having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 28

A co-solvent of water/isopropyl alcohol (57:43 by volume ratio) and 20 wt % of a dry Flemion pellet having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 29

A co-solvent of water/isopropyl alcohol (17:83 by volume ratio) and 1.5 wt % of a dry Flemion fiber (diameter: 2 mm)

having sodium carboxylate (—COO$^-$Na$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 30

A co-solvent of water/isopropyl alcohol (57:43 by volume ratio) and 20 wt % of a dry Flemion fiber (diameter: 0.1 mm) having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 31

A co-solvent of water/isopentyl alcohol (57:43 by volume ratio) and 20 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 32

A co-solvent of water/isopropyl alcohol/acetone (40:20:40 by volume ratio) and 20 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 33

A co-solvent of water/isopropyl alcohol (57:43 by volume ratio), 20 wt % of a dry Flemion membrane having carboxylic acid (—COO$^-$H$^+$) as an ion conductive functional group, and 0.1 wt % of Al$_2$O$_3$ were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 34

A co-solvent of water/isopropyl alcohol (57:43 by volume ratio), 20 wt % of a dry Flemion membrane having carboxylic acid (—COO$^-$H$^+$) as an ion conductive functional group, 1 wt % of Zonyl TBS, and 0.2 wt % of silica (Aerosil 812, hydrophobic silica) were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 35

A co-solvent of water/isopropyl alcohol (25:75 by volume ratio), 5 wt % of a dry Flemion membrane having carboxylic acid (—COO$^-$H$^+$) as an ion conductive functional group, 3 wt % of Zonyl FSP ([F(CF$_2$CF$_2$)$_{3-8}$CH$_2$CH$_2$O]P(O)(ONH$_4$)$_2$, a density of 1.15 g/ml), and 10 wt % of silica (Aerosil 812, hydrophobic silica) were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 36

A co-solvent of water/1-heptanol (57:43 by volume ratio) and 20 wt % of a dry Flemion membrane having carboxylic acid (—COO$^-$H$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 37

A co-solvent of water/isopropyl alcohol (25:75 by volume ratio) and 5 wt % of a dry Nafion 112 membrane having sulfonic acid-ammonium salt (—SO$_3^-$NH$_4^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 38

A co-solvent of water/isopropyl alcohol (57:43 by volume ratio) and 20 wt % of a dry Nafion 112 membrane having sulfonic acid-triethylamine salt (—SO$_3^-$TEA$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 39

A co-solvent of water/isopropyl alcohol (75:25 by volume ratio) and 1.5 wt % of a dry Nafion 112 membrane having sulfonic acid-diethylamine salt (—SO$_3^-$DEA$^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 40

A co-solvent of water/isopropyl alcohol (50:50 by volume ratio) and 1.5 wt % of a dry Nafion 117 membrane having a fluorosulfonyl group as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 41

A co-solvent of water/isopropyl alcohol (50:50 by volume ratio) and 1.5 wt % of a dry Nafion 115 membrane having a fluorosulfonyl group as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 42

A co-solvent of water/isopropyl alcohol (57:43 by volume ratio) and 20 wt % of a dry Nafion 112 pellet having a fluorosulfonyl group as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 43

A co-solvent of water/isopropyl alcohol (25:75 by volume ratio) and 5 wt % of a dry Nafion 112 membrane having lithium sulfonate ($-SO_3^-Li^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 44

A co-solvent of water/isopropyl alcohol (25:75 by volume ratio) and 5 wt % of a dry Nafion 112 membrane having potassium sulfonate ($-SO_3^-K^+$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Example 45

A co-solvent of water/isopropyl alcohol (25:75 by volume ratio) and 5 wt % of a dry Nafion 112 membrane having calcium sulfonate ($-SO_3^{2-}Ca^{2+}$) as an ion conductive functional group were put into a high-temperature and high-pressure reactor so as to be 100 wt % in total, and the resulting mixture was subjected to a supercritical reaction at 120° C. under a pressure of 200 psig for 20 minutes. Thereafter, when the pressure was returned to atmospheric pressure, the reaction was terminated.

Comparative Example 1

A commercially available ionomer dispersion solution (product name: Nafion D521) having the same solvent composition and ionomer content as those in Example 1 was selected.

Comparative Example 2

A commercially available ionomer dispersion solution (product name: Nafion D1021) having the same solvent composition and ionomer content as those in Example 2 was selected.

Comparative Example 3

A commercially available ionomer dispersion solution (product name: Nafion D2021) having the same solvent composition and ionomer content as those in Example 3 was selected.

Experimental Examples

Physical properties of the ionomer dispersion solutions in Examples 1 to 45 and Comparative Examples 1 to 3 were measured by the methods as described below.

1. Azeotropic Mixture Content in Continuous Phase

An azeotropic mixture content was measured with an ionomer dispersion solution through thermogravimetric analysis (TGA) using an SDT2960 apparatus (TA Instruments, New Castle, Del., USA). For this purpose, the ionomer dispersion solution was heated from room temperature to 150° C. at a rate of 5° C./min under a nitrogen atmosphere. When the co-solvent with a known mixing weight ratio is evaporated, the solvent is evaporated at a boiling point of the azeotropic mixture in addition to the boiling point of each component solvent. At this time, a decrease in mass due to the evaporation of the component solvent is discontinuously shown, and an azeotropic mixture content may be obtained by subtracting the content of the solvent from a content of the corresponding solvent in the mixed solvent. The results are shown in Table 1.

TABLE 1

| Classification | Azeotropic mixture content [wt. %] |
|---|---|
| Example 1 | 28.82 |
| Example 2 | 28.81 |
| Example 3 | 47.72 |
| Example 4 | 48.03 |
| Example 5 | 48.23 |
| Example 6 | 20.38 |
| Example 7 | 20.34 |
| Example 8 | 44.89 |
| Example 9 | 20.21 |
| Example 10 | 44.92 |
| Example 11 | 20.19 |
| Example 12 | 20.23 |
| Example 13 | 20.22 |
| Example 14 | 37.87 |
| Example 15 | 32.73 |
| Example 16 | 47.71 |
| Example 17 | 47.74 |
| Example 18 | 28.80 |
| Example 19 | 20.92 |
| Example 20 | 37.81 |

TABLE 1-continued

| Classification | Azeotropic mixture content [wt. %] |
|---|---|
| Example 21 | 28.80 |
| Example 22 | 47.21 |
| Example 23 | 20.35 |
| Example 24 | 20.37 |
| Example 25 | 44.91 |
| Example 26 | 20.17 |
| Example 27 | 44.90 |
| Example 28 | 47.71 |
| Example 29 | 20.22 |
| Example 30 | 47.69 |
| Example 31 | 37.86 |
| Example 32 | 20.01 |
| Example 33 | 47.68 |
| Example 34 | 47.69 |
| Example 35 | 28.79 |
| Example 36 | 47.72 |
| Example 37 | 28.78 |
| Example 38 | 47.71 |
| Example 39 | 20.36 |
| Example 40 | 44.92 |
| Example 41 | 44.93 |
| Example 42 | 47.71 |
| Example 43 | 28.79 |
| Example 44 | 28.80 |
| Example 45 | 28.81 |
| Comparative Example 1 | 13.7 |
| Comparative Example 2 | 14.1 |
| Comparative Example 3 | 17.8 |

Referring to Table 1, it can be seen that the azeotropic mixture contents in the Examples where the supercritical reaction was carried out were higher than those in the Comparative Examples. It can be seen that due to the high azeotropic mixture content in the continuous phase, it is possible to lower the boiling point of the continuous phase and to readily remove the solvent.

2. Viscosity of Dispersion Solution

A spin needle was introduced into the ionomer dispersion solution by using a Haake RheoStress 1 (Thermo Scientific Inc., USA) apparatus, and a viscosity was obtained through a measured shear rate and the measurement of a shear stress by rotating the spin needle. The measured viscosity was a result obtained at a shear rate of 70/sec, and the results are shown in Table 2.

TABLE 2

| Classification | Viscosity [cP] |
|---|---|
| Example 1 | 88.6 |
| Example 2 | 143.3 |
| Example 3 | 220.26 |
| Example 4 | 211.18 |
| Example 5 | 206.9 |
| Example 6 | 11.12 |
| Example 7 | 10.9 |
| Example 8 | 15.83 |
| Example 9 | 20.12 |
| Example 10 | 12.0 |
| Example 11 | 21.2 |
| Example 12 | 20.81 |
| Example 13 | 19.1 |
| Example 14 | 230.89 |
| Example 15 | 225.7 |
| Example 16 | 229.21 |
| Example 17 | 231.42 |
| Example 18 | 92.53 |
| Example 19 | 89.88 |
| Example 20 | 231.11 |
| Example 21 | 90.22 |
| Example 22 | 240 |
| Example 23 | 10.83 |
| Example 24 | 9.9 |
| Example 25 | 11.09 |
| Example 26 | 22.43 |
| Example 27 | 11.11 |
| Example 28 | 213.03 |
| Example 29 | 21.44 |
| Example 30 | 209.98 |
| Example 31 | 226.14 |
| Example 32 | 228.08 |
| Example 33 | 230.03 |
| Example 34 | 231.94 |
| Example 35 | 90 |
| Example 36 | 228.61 |
| Example 37 | 93.33 |
| Example 38 | 219.23 |
| Example 39 | 10.28 |
| Example 40 | 13 |
| Example 41 | 11.99 |
| Example 42 | 222.21 |
| Example 43 | 93.62 |
| Example 44 | 95 |
| Example 45 | 93.42 |
| Comparative Example 1 | 9.2 |
| Comparative Example 2 | 11.6 |
| Comparative Example 3 | 163.8 |

Referring to Table 2, it can be seen that the viscosities of the dispersion solutions shown in the Comparative Examples were lower than those in the Examples. That is, Comparative Example 3 has the same solvent composition and ionomer content as those in Example 3, but the commercially available existing ionomer dispersion solution in an emulsion state has a lower viscosity than that of Example 3 of the present invention. This is because an initially introduced ionomer is introduced while having a high molecular weight in Example 3 of the present invention.

3. Molecular Weight and Molecular Weight Distribution

After a membrane was fabricated by using an ionomer dispersion solution, the membrane was dissolved in N-methylpyrrolidone containing 0.05 M LiCl, and then a molecular weight distribution was measured by using a gel permeation chromatograph (GPC) method. The results are shown in Table 3.

TABLE 3

| Classification | Molecular weight [Da] | Molecular weight distribution [PDI] |
|---|---|---|
| Example 1 | 93,000 | 2.14 |
| Example 2 | 93,500 | 2.21 |
| Example 3 | 91,700 | 2.16 |
| Example 4 | 92,000 | 2.11 |
| Example 5 | 92,700 | 2.17 |
| Example 6 | 93,500 | 2.13 |
| Example 7 | 93,000 | 2.2 |
| Example 8 | 93,000 | 2.19 |
| Example 9 | 93,700 | 2.17 |
| Example 10 | 93,500 | 2.15 |
| Example 11 | 92,700 | 2.15 |
| Example 12 | 91,800 | 2.16 |
| Example 13 | 92,500 | 2.13 |
| Example 14 | 90,700 | 2.15 |
| Example 15 | 91,500 | 2.14 |
| Example 16 | 93,000 | 2.15 |
| Example 17 | 93,700 | 2.23 |
| Example 18 | 94,500 | 2.16 |
| Example 19 | 297,700 | 2.22 |
| Example 20 | 94,500 | 2.17 |

TABLE 3-continued

| Classification | Molecular weight [Da] | Molecular weight distribution [PDI] |
| --- | --- | --- |
| Example 21 | 389,500 | 2.23 |
| Example 22 | 396,500 | 2.25 |
| Example 23 | 397,000 | 2.19 |
| Example 24 | 391,700 | 2.18 |
| Example 25 | 392,000 | 2.25 |
| Example 26 | 393,500 | 2.26 |
| Example 27 | 390,000 | 2.24 |
| Example 28 | 389,500 | 2.21 |
| Example 29 | 388,700 | 2.25 |
| Example 30 | 386,500 | 2.24 |
| Example 31 | 390,000 | 2.23 |
| Example 32 | 384,700 | 2.27 |
| Example 33 | 395,000 | 2.2 |
| Example 34 | 394,700 | 2.19 |
| Example 35 | 395,500 | 2.24 |
| Example 36 | 470,000 | 2.21 |
| Example 37 | 92,700 | 2.15 |
| Example 38 | 93,700 | 2.11 |
| Example 39 | 92,500 | 2.11 |
| Example 40 | 95,000 | 2.15 |
| Example 41 | 94,700 | 2.09 |
| Example 42 | 93,500 | 2.11 |
| Example 43 | 93,000 | 2.14 |
| Example 44 | 92,500 | 2.14 |
| Example 45 | 92,700 | 2.11 |
| Comparative Example 1 | 63,000 | 2.94 |
| Comparative Example 1 | 64,000 | 2.91 |
| Comparative Example 1 | 66,000 | 2.93 |

Referring to Table 3, the molecular weight and molecular weight distribution of the existing commercially available ionomer dispersion solution are compared with those of the dispersion solutions in the present Examples. The existing commercially available ionomer dispersion solution is formed and dispersed by an emulsion polymerization reaction, and thus has a low molecular weight and a relatively high molecular weight distribution. However, in the present invention, the ionomer having a high molecular weight and a uniform polydispersity is introduced into the preparing of the mixed solution and subjected to a supercritical reaction, so that it is possible to obtain ionomer nanoparticles without any loss in the molecular weight and the molecular weight distribution. Further, in particular, the narrow molecular weight distribution of the present invention allows a polymer electrolyte membrane formed by molding the membrane to have chemical stability and thermal stability.

4. Average Particle Size of Ionomers

An average particle size of ionomers in the ionomer dispersion solution is measured by using a dynamic light scattering device (Zetasizer, Model HAS 300, Malvern, Worcestershire, UK), and the results are shown in Table 4.

TABLE 4

| Classification | Average particle size [nm] |
| --- | --- |
| Example 1 | 11 |
| Example 2 | 3 |
| Example 3 | 0.09 |
| Example 4 | 0.07 |
| Example 5 | 0.05 |
| Example 6 | 43 |
| Example 7 | 31 |
| Example 8 | 68 |
| Example 9 | 83 |
| Example 10 | 94 |
| Example 11 | 80 |

TABLE 4-continued

| Classification | Average particle size [nm] |
| --- | --- |
| Example 12 | 96 |
| Example 13 | 93 |
| Example 14 | 0.9 |
| Example 15 | 49 |
| Example 16 | 209 |
| Example 17 | 230 |
| Example 18 | 280 |
| Example 19 | 241 |
| Example 20 | 0.1 |
| Example 21 | 270 |
| Example 22 | 300 |
| Example 23 | 325 |
| Example 24 | 330 |
| Example 25 | 378 |
| Example 26 | 490 |
| Example 27 | 351 |
| Example 28 | 327 |
| Example 29 | 468 |
| Example 30 | 330 |
| Example 31 | 329 |
| Example 32 | 512 |
| Example 33 | 328 |
| Example 34 | 331 |
| Example 35 | 337 |
| Example 36 | 137 |
| Example 37 | 198 |
| Example 38 | 23 |
| Example 39 | 86 |
| Example 40 | 80 |
| Example 41 | 64 |
| Example 42 | 69 |
| Example 43 | 21 |
| Example 44 | 47 |
| Example 45 | 134 |
| Comparative Example 1 | 17 |
| Comparative Example 2 | 11 |
| Comparative Example 3 | 6 |

Referring to Table 4, it can be seen that Examples 1 to 3 have smaller average particle sizes than those in Comparative Examples 1 to 3. That is, it can be seen that as ionomers having a relatively uniform molecular weight according to the present invention are subjected to a supercritical reaction and then prepared into nanoparticles, excessive aggregation between the particles decreases unlike the commercially available emulsion, and as a result, the ionomers are formed as nanoparticles having a relatively small size.

5. Dispersion Stability

A spin needle was introduced into the ionomer dispersion solution by using a Haake RheoStress 1 (Thermo Scientific Inc., USA) apparatus, a shear rate and a shear stress were measured by rotating the spin needle, and a dispersion stability (shear stress/(shear rate−shear stress)) was obtained by using the obtained shear rate and shear stress. The results are shown in Table 5.

TABLE 5

| Classification | Dispersion stability |
| --- | --- |
| Example 1 | 1.098 |
| Example 2 | 1.089 |
| Example 3 | 1.077 |
| Example 4 | 1.076 |
| Example 5 | 1.079 |
| Example 6 | 1.097 |
| Example 7 | 1.098 |
| Example 8 | 1.099 |
| Example 9 | 1.096 |
| Example 10 | 1.096 |

TABLE 5-continued

| Classification | Dispersion stability |
|---|---|
| Example 11 | 1.099 |
| Example 12 | 1.097 |
| Example 13 | 1.099 |
| Example 14 | 1.078 |
| Example 15 | 1.079 |
| Example 16 | 1.076 |
| Example 17 | 1.076 |
| Example 18 | 1.089 |
| Example 19 | 1.087 |
| Example 20 | 1.077 |
| Example 21 | 1.088 |
| Example 22 | 1.077 |
| Example 23 | 1.099 |
| Example 24 | 1.099 |
| Example 25 | 1.098 |
| Example 26 | 1.096 |
| Example 27 | 1.095 |
| Example 28 | 1.078 |
| Example 29 | 1.099 |
| Example 30 | 1.079 |
| Example 31 | 1.076 |
| Example 32 | 1.077 |
| Example 33 | 1.079 |
| Example 34 | 1.077 |
| Example 35 | 1.098 |
| Example 36 | 1.074 |
| Example 37 | 1.095 |
| Example 38 | 1.076 |
| Example 39 | 1.101 |
| Example 40 | 1.121 |
| Example 41 | 1.099 |
| Example 42 | 1.073 |
| Example 43 | 1.099 |
| Example 44 | 1.097 |
| Example 45 | 1.096 |
| Comparative Example 1 | 1.027 |
| Comparative Example 2 | 1.012 |
| Comparative Example 3 | 1.031 |

Referring to Table 5, it can be seen that the ionomer nanoparticle dispersion solutions prepared in the Examples of the present invention show higher values in terms of dispersion stability than those in the Comparative Examples which are existing products. That is, it can be seen that the Examples of the present invention have higher dispersion stabilities than the dispersion stability of an existing nanoparticle dispersion solution.

6. Thermal Decomposition Temperatures of Ion Conductive Functional Group and Polymer Main Chain During Preparation of Membrane After a membrane was fabricated by using an ionomer dispersion solution, the thermal decomposition temperatures of the ion conductive functional group and the polymer main chain were measured through thermogravimetric analysis (TGA) using an SDT2960 apparatus (TA instrument, New Castle, Del., USA). Prior to the measurement, a sample was treated under a nitrogen atmosphere of 90° C. for 10 minutes in order to remove water contained in the sample, the temperature was dropped to 50° C., and then the sample was heated to 600° C. at a rate of 10° C./min. The ion conductive functional group was primarily decomposed prior to the decomposition of the main chain, and at this time, the temperature $T_d$ at which the decomposition began was measured. The results are shown in Table 6.

TABLE 6

| Classification | Thermal decomposition temperature ($T_d$) of ion conductive functional group |
|---|---|
| Example 1 | 137 |
| Example 2 | 138 |
| Example 3 | 144 |
| Example 4 | 140 |
| Example 5 | 143 |
| Example 6 | 360 |
| Example 7 | 368 |
| Example 8 | 364 |
| Example 9 | 369 |
| Example 10 | 362 |
| Example 11 | 363 |
| Example 12 | 360 |
| Example 13 | 361 |
| Example 14 | 142 |
| Example 15 | 140 |
| Example 16 | 145 |
| Example 17 | 141 |
| Example 18 | 143 |
| Example 19 | 201 |
| Example 20 | 141 |
| Example 21 | 206 |
| Example 22 | 204 |
| Example 23 | 300 |
| Example 24 | 304 |
| Example 25 | 301 |
| Example 26 | 305 |
| Example 27 | 302 |
| Example 28 | 307 |
| Example 29 | 300 |
| Example 30 | 302 |
| Example 31 | 207 |
| Example 32 | 203 |
| Example 33 | 202 |
| Example 34 | 209 |
| Example 35 | 208 |
| Example 36 | 201 |
| Example 37 | 386 |
| Example 38 | 207 |
| Example 39 | 206 |
| Example 40 | 356 |
| Example 41 | 351 |
| Example 42 | 352 |
| Example 43 | 330 |
| Example 44 | 379 |
| Example 45 | 399 |
| Comparative Example 1 | 103 |
| Comparative Example 2 | 101 |
| Comparative Example 3 | 106 |

Referring to Table 6, it can be seen that the decomposition temperatures of the ion conductive functional groups in the polymer electrolyte membranes prepared in the Examples of the present invention are higher than those in the Comparative Examples. The higher decomposition temperature shows that the polymer electrolyte membrane prepared according to the present invention has a high thermal stability.

7. Chemical Stability Under Radical Condition

After a membrane was fabricated by using an ionomer dispersion solution, the resulting membrane was exposed to a Fenton reagent (3 wt % of $H_2O_2$ including 2 ppm of $FeSO_4$, 80° C.) simulating a radical generation condition for 7 hours, and then a mechanical strength of a sample was measured in accordance with the ASTM D882 method using an Instron mechanical testing machine (INSTRON 1708, Boston, Mass., USA). At this time, the crosshead speed was 5 $mm^{-1}$, and the measurement temperature was 25° C. The results are shown in Table 7.

TABLE 7

| Classification | Tensile strength [MPa] | Elongation [%] |
|---|---|---|
| Example 1 | 27.8 | 271.4 |
| Example 2 | 28.1 | 268.1 |
| Example 3 | 29.2 | 267.9 |
| Example 4 | 29.3 | 271.1 |
| Example 5 | 29.7 | 271.2 |
| Example 6 | 26.1 | 269.1 |
| Example 7 | 25.6 | 274.1 |
| Example 8 | 25.4 | 276.5 |
| Example 9 | 24.9 | 268.9 |
| Example 10 | 25.1 | 269.7 |
| Example 11 | 25.4 | 269.8 |
| Example 12 | 25.8 | 268.9 |
| Example 13 | 24.9 | 269.9 |
| Example 14 | 29.3 | 271.9 |
| Example 15 | 29.1 | 272.0 |
| Example 16 | 29.1 | 271.0 |
| Example 17 | 28.5 | 270.8 |
| Example 18 | 27.6 | 269.8 |
| Example 19 | 26.1 | 270.1 |
| Example 20 | 28.5 | 269.7 |
| Example 21 | 27.1 | 271.1 |
| Example 22 | 29.1 | 268.9 |
| Example 23 | 24.3 | 269.8 |
| Example 24 | 25.7 | 269.6 |
| Example 25 | 25.3 | 272.0 |
| Example 26 | 25.8 | 271.1 |
| Example 27 | 25.4 | 269.4 |
| Example 28 | 29.5 | 272.0 |
| Example 29 | 24.9 | 271.5 |
| Example 30 | 28.7 | 269.9 |
| Example 31 | 29.1 | 269.8 |
| Example 32 | 29.2 | 268.9 |
| Example 33 | 28.4 | 273.0 |
| Example 34 | 28.9 | 271.7 |
| Example 35 | 26.8 | 271.6 |
| Example 36 | 28.7 | 271.4 |
| Example 37 | 26.8 | 272.1 |
| Example 38 | 29.1 | 269.9 |
| Example 39 | 24.1 | 268.9 |
| Example 40 | 25.8 | 269.4 |
| Example 41 | 29.2 | 268.9 |
| Example 42 | 27.8 | 271.2 |
| Example 43 | 26.5 | 271.9 |
| Example 44 | 24.5 | 271.8 |
| Example 45 | 25.1 | 271.8 |
| Comparative Example 1 | 19.5 | 239.5 |
| Comparative Example 2 | 19.8 | 255.9 |
| Comparative Example 3 | 21.1 | 262.3 |

Referring to Table 7, the polymer electrolyte membrane prepared in the Examples of the present invention exhibit higher tensile strengths and higher elongations than those in the Comparative Examples, even after being exposed to the radical generation conditions. That is, it can be seen that as the polymer electrolyte membrane according to the present invention maintains high chemical stability even under the radical generation condition, tensile strength and elongation, which are mechanical characteristics, are maintained. In contrast, Comparative Examples 1 to 3, which are characteristics of a polymer electrolyte membrane prepared by using an existing ionomer dispersion solution, exhibit relatively low tensile strength and elongation. It is understood that the polymer electrolyte membrane is exposed to the radical generation condition, and as a result, chemical stability is impaired and mechanical characteristics also deteriorate.

8. Mechanical Strength

After a membrane was fabricated by using an ionomer dispersion solution, the mechanical strength was measured in accordance with the ASTM D882 method using an Instron mechanical testing machine (INSTRON 1708, Boston, Mass., USA). At this time, the crosshead speed was 5 mm$^{-1}$, and the measurement temperature was 25° C. The results are shown in Table 8.

TABLE 8

| Classification | Tensile strength [MPa] | Elongation [%] |
|---|---|---|
| Example 1 | 35 | 266.1 |
| Example 2 | 38 | 270.2 |
| Example 3 | 38 | 265.8 |
| Example 4 | 37 | 265.9 |
| Example 5 | 35 | 259.1 |
| Example 6 | 39 | 275.8 |
| Example 7 | 35 | 274.9 |
| Example 8 | 36 | 274.1 |
| Example 9 | 34 | 274.5 |
| Example 10 | 34 | 269.2 |
| Example 11 | 37 | 267.5 |
| Example 12 | 39 | 269.4 |
| Example 13 | 38 | 274.1 |
| Example 14 | 34 | 275 |
| Example 15 | 31 | 269.9 |
| Example 16 | 37 | 273.5 |
| Example 17 | 41 | 280.1 |
| Example 18 | 43 | 280 |
| Example 19 | 31 | 279.6 |
| Example 20 | 33 | 278.6 |
| Example 21 | 30 | 279.3 |
| Example 22 | 32 | 274.5 |
| Example 23 | 33 | 278.1 |
| Example 24 | 33 | 274.9 |
| Example 25 | 30 | 280.1 |
| Example 26 | 31 | 276.8 |
| Example 27 | 31 | 279.1 |
| Example 28 | 32 | 278.5 |
| Example 29 | 33 | 278.8 |
| Example 30 | 31 | 279.1 |
| Example 31 | 34 | 281.1 |
| Example 32 | 30 | 276.9 |
| Example 33 | 36 | 278.8 |
| Example 34 | 42 | 281.2 |
| Example 35 | 42 | 282.5 |
| Example 36 | 31 | 278.1 |
| Example 37 | 34 | 283.8 |
| Example 38 | 36 | 271.9 |
| Example 39 | 39 | 280.1 |
| Example 40 | 37 | 279.9 |
| Example 41 | 38 | 279.8 |
| Example 42 | 38 | 279.9 |
| Example 43 | 37 | 278.2 |
| Example 44 | 36 | 278.9 |
| Example 45 | 38 | 278.1 |
| Comparative Example 1 | 26 | 246.8 |
| Comparative Example 2 | 28 | 253.1 |
| Comparative Example 3 | 30 | 260.1 |

Referring to Table 8, it can be seen that the polymer electrolyte membranes prepared in the Examples of the present invention have higher tensile strengths and higher elongations than those in the Comparative Examples. That is, it can be seen that the polymer electrolyte membrane prepared according to the present invention secures higher mechanical stability than that of the existing commercially available product. Further, when compared to Table 7, little change in elongation occurred even under the radical generation condition in the present invention. However, it can be seen that in Comparative Examples 1 to 3, the elongation in Table 7 is sharply decreased compared to that in Table 8. That is, it can be confirmed that in the Examples of the present invention, the polymer electrolyte membranes has high mechanical stability, and it can be seen that in the Examples of the present invention, chemical stability also maintains excellent characteristics.

9. Hydrogen Ion Conductivity

After a membrane was fabricated by using an ionomer dispersion solution, a sample with a predetermined size (1*4 cm$^2$) was mounted on a resistance measurement cell at 30° C., including ultrapure water, and the resistance (R) was measured by using an impedance measurement apparatus through a quadrupole alternating current impedance method. A result was obtained by substituting the measured conductivity into the equation [S/cm]=I [cm]/(R[Ω]*S[cm$^2$]) and calculating the value. In the right term of the equation, S denotes a cross-sectional area through which current flows, and I denotes a distance between electrodes where a voltage drop occurs.

TABLE 9

| Classification | Hydrogen ion conductivity 30° C. ultrapure water [S/cm] |
| --- | --- |
| Example 1 | 0.109 |
| Example 2 | 0.112 |
| Example 3 | 0.113 |
| Example 4 | 0.113 |
| Example 5 | 0.112 |
| Example 6 | 0.0981 |
| Example 7 | 0.099 |
| Example 8 | 0.0987 |
| Example 9 | 0.0983 |
| Example 10 | 0.0991 |
| Example 11 | 0.0988 |
| Example 12 | 0.098 |
| Example 13 | 0.0989 |
| Example 14 | 0.118 |
| Example 15 | 0.121 |
| Example 16 | 0.116 |
| Example 17 | 0.113 |
| Example 18 | 0.115 |
| Example 19 | 0.108 |
| Example 20 | 0.117 |
| Example 21 | 0.107 |
| Example 22 | 0.108 |
| Example 23 | 0.095 |
| Example 24 | 0.096 |
| Example 25 | 0.1 |
| Example 26 | 0.099 |
| Example 27 | 0.098 |
| Example 28 | 0.098 |
| Example 29 | 0.097 |
| Example 30 | 0.094 |
| Example 31 | 0.11 |
| Example 32 | 0.108 |
| Example 33 | 0.111 |
| Example 34 | 0.118 |
| Example 35 | 0.12 |
| Example 36 | 0.118 |
| Example 37 | 0.099 |
| Example 38 | 0.098 |
| Example 39 | 0.099 |
| Example 40 | 0.12 |
| Example 41 | 0.119 |
| Example 42 | 0.12 |
| Example 43 | 0.09 |
| Example 44 | 0.091 |
| Example 45 | 0.093 |
| Comparative Example 1 | 0.097 |
| Comparative Example 2 | 0.108 |
| Comparative Example 3 | 0.101 |

In Table 9, the hydrogen ion conductivities in Examples 1 to 3 and Comparative Examples 1 to 3 can be compared with one another. That is, Comparative Example 1 has the same solvent composition and ionomer content as those in Example 1, but Example 1 is different from Comparative Example 1 in terms of whether the ionomer dispersion solution is subjected to a supercritical reaction. The same applies to Comparative Example 2 and Example 2, and Comparative Example 3 and Example 3. It can be seen that in the hydrogen ion conductivity when the ionomer dispersion solution is subjected to a supercritical reaction as in the present Examples, a higher hydrogen ion conductivity can be secured compared to those in the Preparation Examples where the ion dispersion solution is not subjected to a supercritical reaction.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

The invention claimed is:

1. An ionomer nanoparticle dispersion solution comprising:
   a continuous-phase having a solvent mixture configured as water and alcohols; and
   ionomer nanoparticles prepared with a perfluorinated ionomer which is dispersed in the solvent mixture and is insoluble in the solvent mixture,
   wherein the continuous-phase has an azeotropic mixture content of 25 wt % to 50 wt %.

2. The ionomer nanoparticle dispersion solution of claim 1, wherein the ionomer has one or more ion conductive functional groups selected from a group consisting of sulfonic acid, a sulfonate, carboxylic acid, a carboxylate, and a fluorosulfonyl.

3. The ionomer nanoparticle dispersion solution of claim 2, wherein the sulfonate has lithium sulfonate, sodium sulfonate, potassium sulfonate, calcium sulfonate, magnesium sulfonate, ammonium sulfonate, or alkylammonium sulfonate.

4. The ionomer nanoparticle dispersion solution of claim 2, wherein the carboxylate has lithium carboxylate, sodium carboxylate, potassium carboxylate, or alkylammonium carboxylate.

5. The ionomer nanoparticle dispersion solution of claim 1, wherein the continuous-phase has a volume ratio of water to an alcohol of 17:83 to 75:25.

6. The ionomer nanoparticle dispersion solution of claim 1, wherein the alcohol is at least one selected from a group consisting of methanol, ethanol, 1-propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol, and a mixture thereof.

7. The ionomer nanoparticle dispersion solution of claim 1, wherein the continuous-phase further comprises an organic plasticizer for inducing strong bonding or cohesive strength between the perfluorinated ionomer nanoparticles.

8. The ionomer nanoparticle dispersion solution of claim 7, wherein the organic plasticizer is at least one selected from a group consisting of acetone, ethyl carbonate, propylene carbonate, diethyl carbonate, dimethyl carbonate, ethyl methyl carbonate, fluoroethylene carbonate, dimethylacetamide, dimethyl sulfoxide, dimethylformamide, and N-methylpyrrolidone.

9. The ionomer nanoparticle dispersion solution of claim 7, wherein the organic plasticizer is comprised in a content of 0.01 wt % to 40 wt % in the ionomer nanoparticle dispersion solution.

10. The ionomer nanoparticle dispersion solution of claim 1, wherein the perfluorinated ionomer is at least one selected from a group consisting of poly(perfluorosulfonic acid), poly(perfluorocarboxylic acid), a copolymer of tetrafluoroethylene and fluorovinylether comprising a sulfonic acid group, and a combination thereof.

11. The ionomer nanoparticle dispersion solution of claim 1, wherein the ionomer nanoparticles have an average particle size of 0.01 nm to 600 nm.

12. The ionomer nanoparticle dispersion solution of claim 1, wherein the ionomer nanoparticles are included in a content of 0.01 wt % to 30 wt % in the ionomer nanoparticle dispersion solution.

13. The ionomer nanoparticle dispersion solution of claim 1, wherein the perfluorinated ionomer has a molecular weight distribution (polydispersity index) of 1.0 to 2.5.

14. The ionomer nanoparticle dispersion solution of claim 1, wherein an additive is further comprised in the ionomer nanoparticle dispersion solution, the additive being any one selected from a group consisting of TiO2, SiO2, Al2O3, ZrO2, tetraethoxysilane (TEOS), montmorillonite, mordenite, zirconium phosphate (ZrP), phosphotungstic acid, silicotungstic acid, phosphomolybdic acid, silicomolybdic acid, and a mixture thereof.

15. The ionomer nanoparticle dispersion solution of claim 1, wherein the perfluorinated ionomer has a molecular weight of 70,000 Da to 500,000 Da.

16. The ionomer nanoparticle dispersion solution of claim 1, wherein the ionomer nanoparticle dispersion solution has a viscosity of 10 cP to 250 cP.

17. The ionomer nanoparticle dispersion solution of claim 1, wherein the ionomer nanoparticle dispersion solution has a thermal decomposition temperature greater than 137° C.

18. The ionomer nanoparticle dispersion solution of claim 1, wherein the dispersion stability is greater than 1.072.

19. The ionomer nanoparticle dispersion solution of claim 1, wherein the alcohol is isopropyl alcohol.

* * * * *